May 11, 1954 H. M. FLEMING 2,678,161

ITEM COUNT MEANS FOR ADDING-LISTING MACHINES

Filed Aug. 25, 1951 6 Sheets-Sheet 1

INVENTOR
HOWARD M. FLEMING
BY Elmer W. Edwards
AGENT

ITEM COUNT MEANS FOR ADDING-LISTING MACHINES

Filed Aug. 25, 1951

6 Sheets-Sheet 2

INVENTOR
HOWARD M. FLEMING
BY
Elmer M. Edwards
AGENT

May 11, 1954 H. M. FLEMING 2,678,161

ITEM COUNT MEANS FOR ADDING-LISTING MACHINES

Filed Aug. 25, 1951 6 Sheets-Sheet 3

INVENTOR
HOWARD M. FLEMING
BY Elmer M. Edwards
AGENT

May 11, 1954 H. M. FLEMING 2,678,161

ITEM COUNT MEANS FOR ADDING-LISTING MACHINES

Filed Aug. 25, 1951 6 Sheets-Sheet 4

INVENTOR
HOWARD M. FLEMING
BY Elmer M. Edwards
AGENT

INVENTOR
HOWARD M. FLEMING
BY Elmer M. Edwards
AGENT

May 11, 1954 H. M. FLEMING 2,678,161

ITEM COUNT MEANS FOR ADDING-LISTING MACHINES

Filed Aug. 25, 1951 6 Sheets-Sheet 6

INVENTOR
HOWARD M. FLEMING
BY
Elmer M. Edwards
AGENT

Patented May 11, 1954 2,678,161

UNITED STATES PATENT OFFICE 2,678,161

ITEM COUNT MEANS FOR ADDING-LISTING MACHINES

Howard M. Fleming, West Orange, N. J., assignor to Monroe Calculating Machine Company, Orange, N. J., a corporation of Delaware Application August 25, 1951, Serial No. 243,659

10 Claims. (Cl. 235—60.23)

The invention relates to adding-listing machines and more particularly to novel means for effecting a net count of the items accumulated additively and subtractively into the register or accumulator wheels thereof.

The present invention contemplates improved means for utilizing the higher order register wheels of such a machine for the purpose of effecting a count of the items recorded upon the lower order wheels of the register.

The invention provides means whereby items added into the register wheels are counted into the item count wheels of the register in a plus manner, while a subtractive operation performed upon the register wheels will automatically subtract a count from the item count wheels.

Provision is also made to automatically disable the item count means in those operations which do not involve entering amounts either additively or subtractively into the register.

The above objects are accomplished in the present invention by means which in no way alter the touch or force required in operating the digit keys or the operation control keys of the keyboard.

Manually adjustable means for disabling the item count devices provides for the use of the item count wheels for accumulating values, thus retaining maximum capacity of the register in operations wherein item counting is not required.

With the foregoing and incidental features in view, the invention includes the novel features of construction and combination of parts, the essential elements of which are set forth in the appended claims and a preferred embodiment of which is hereinafter described with reference to the drawings which accompany and form a part of this specification.

Item count means for counting the number of quantities, values or items as they are registered in the machine are well known in the art. Such means were heretofore in the main directed to the accumulation of item counts wherein the machine is operated for both plus and minus operations, while the item counting means operates in a plus direction only.

On some forms of work, however, the net count of items, i. e., the number of plus accumulations less the number of subtractive accumulations is required to be listed. Also in the event that an operator should inadvertently register an incorrect amount, the subsequent correcting of such an entry should not be included as a counted item but instead should be deducted from the count which was entered into the counter during the incorrect operation.

It is also advantageous to maintain the uniformity and ease of pressure required to operate the various keys of the keyboard to which the operator has become accustomed, and heretofore inclusion of an item count means has required an undesirable increase in the load placed on these keys.

The present invention contemplates novel means for accomplishing the above advantages and is shown as applied to a listing-adding machine of well known type such as that disclosed in its essential features in U. S. Patent 1,932,013, issued October 24, 1933 to Loring P. Crosman, and as modified by the disclosure of Patents 2,307,669 and 2,330,270 issued to the same inventor on January 5, 1943 and September 28, 1943, respectively.

In so far as it is expedient, the parts hereinafter described which correspond to like parts in the foregoing patents will be similarly numbered and reference is made to these patents for details of construction not completely described in the following specification.

*Adding and subtracting*

Figure 3:
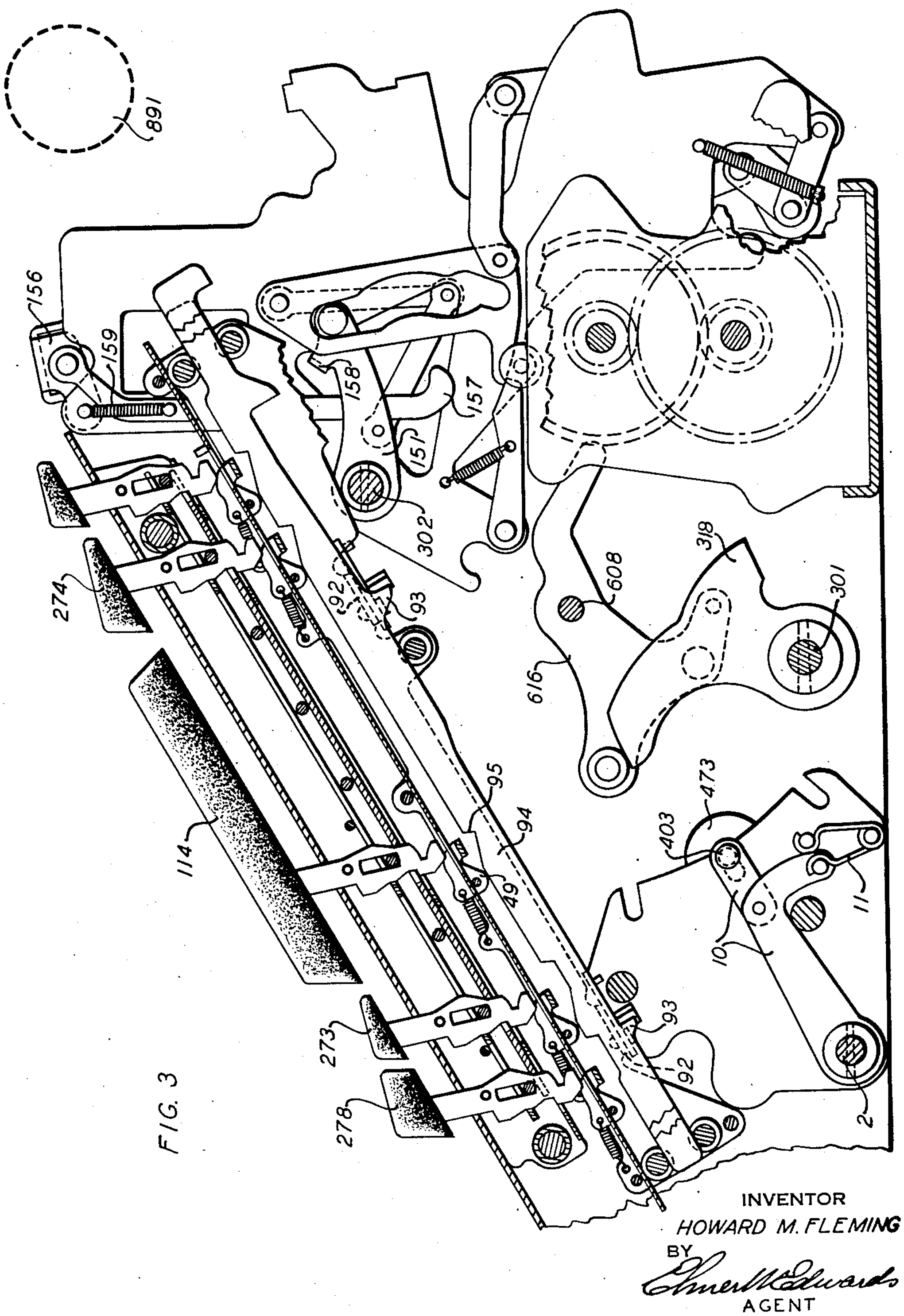
Fig. 3 is a right side elevation showing the accumulator meshing means, the slide controlling the digit index bars, etc.

As set forth in the reference patents, amounts set up on digit keys 215 (Fig. 1) for each denominational order are transferred additively or subtractively upon operation of plus key 114 (Fig. 3) or minus operating key 274, to a series of accumulator or register wheels 473 by means of a series of spring operated differential actuators 610 loosely mounted upon a transverse shaft 608. The forward arm of each differential actuator lever 610 is provided with segmental rack teeth, adapted to mesh with the pinions 472 of the series of accumulator wheels 473. Index bars 615 are pivotally connected to the upper arms of levers 610, these index bars being moved, upon counterclockwise rotation of the levers, into engagement with the stems of selectively depressed keys 215. The type bars 611 are pivotally connected to the rearward arms of levers 610, each type bar being provided with a longitudinally disposed series of type representing the digits 0 and 1 to 9.

The digit keys 215 which have been depressed to represent a value are latched in position with the bottoms of their stems lying in the path of movement of the stop lugs of the related bars 615, allowing such bars to advance a distance proportional to the value of the key, upon operation of the machine. Depression of a digit key will also remove a column latch 214 from the path of movement of its related stop bar 615, these latches preventing movement of a stop bar and lever 610 in any column in which no key is depressed.

Each of the racks 610 is held in its normal clockwise position against tension of its respective spring 683, by a stud 659 fast in said racks and having engagement with a series of dogs 617 pivotally mounted upon a transverse rod 618 supported within a rocker frame 616 loosely mounted on the shaft 608.

Figure 2:
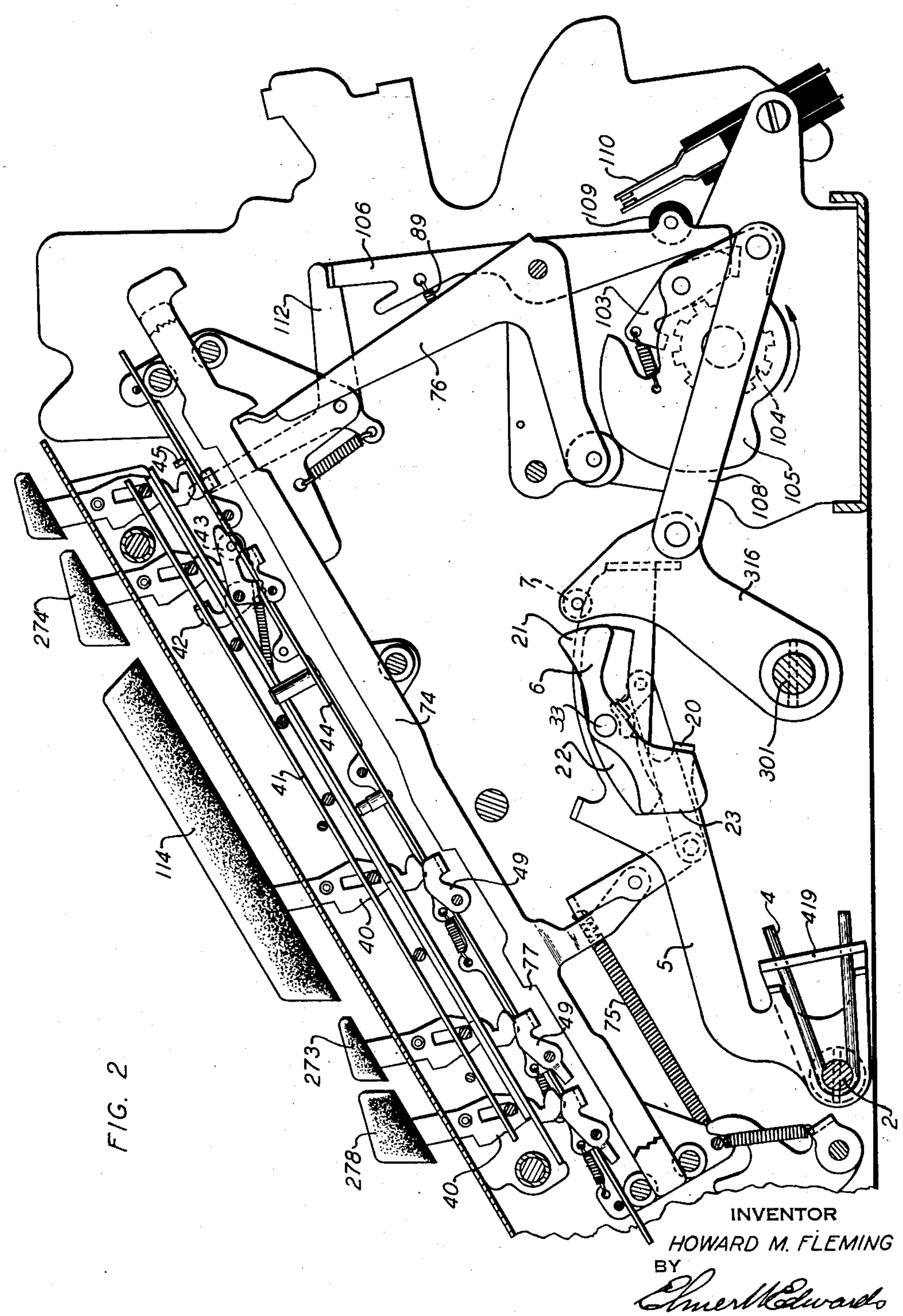
Fig. 2 is a right side elevation of the operating keys, the sign control slide and associated parts.

A rock shaft 301 is oscillated by means of an electric motor 100 connected through suitable gearing and clutch means 103—104 (Fig. 2) with a rock arm 316, fast with shaft 301 by means of a connecting rod 108 so that as a crank arm 105 is rotated by the motor shaft 301 will be oscillated.

Rock shaft 301 is provided with cam means 318 (Figs. 1 and 3) for governing the movement of frame 616. As shaft 301 is rotated forwardly, cam 318 will permit frame 616 under influence of spring 616′ to be rocked counterclockwise and any of the levers 610 which have been released by the depression of digit keys 215 will be allowed to rotate under influence of their springs 683 until they are stopped by the lugs of bar 615 contacting with the stems of the depressed keys. Upon rearward return movement of shaft 301, the cam 318 will restore frame 616 and the dogs 617 will return the operated levers 610 to normal position. This excursion of the levers 610 serves to register amounts set in the keyboard upon one or more accumulators 473 and to set up a similar amount on the printing line of the type bars.

Release of clutch pawl 103 is effected upon depression of any of the motor keys, the stems of which are provided with a cam surface 40 (Fig. 2) acting upon depression of a key to move a slide 41 forwardly, thereby operating a bell crank lever 42, raising roller 43 of said lever out of engagement with a suitable opening in a spring operated slide 44. Slide 44 is provided with a lug 45, which upon depression of an operating key and subsequent forward operation of slide 44 engages the upper arm of a pivoted latch 112, thereby releasing said latch from clutch control lever 106, whereupon said lever will be moved counterclockwise by its spring 89 and an insulation roller 109 on said lever will act to close a switch 110 in the circuit of the electric motor. In this movement, the lower end of lever 106 will be disengaged from the tail of the spring urged clutch pawl 103 and allow said pawl to fall into engagement with the driving clutch member 104 to effect a machine cycle of operation.

During a cycle of operation the wheels of the accumulators 473, if engaged, are rotated subtractively upon the forward stroke or additively upon the return stroke of the actuators 610, there being an actuator lever 610 and an associated accumulator wheel for each order provided in the machine, the timed meshing and unmeshing of the accumulator gears being controlled as follows, and as more fully described in U. S. Patent 2,055,623, granted September 29, 1936, to Loring P. Crosman and entitled "Calculating Machine" to which reference is made for more detailed description.

As shown (Fig. 1), the accumulator pinions 472 stand normally in mesh with the segment gears of actuators 610, the accumulator shaft 403 being mounted in guide slots (Fig. 3) of the machine frame so that the accumulator assembly may be moved radially of the actuators, to mesh and unmesh the pinions 472. Shaft 403 is adjusted by means of toggle linkage 10, one member of which is fast upon a rock shaft 2. The linkage is held in either of two adjusted positions by a toggle spring 11. Fast upon shaft 2 is a plate 419 (Fig. 2) having yieldable spring connection 4 with an arm 5 provided with a lateral flange 22. Pivoted at 33 upon said arm is a cam switch 6 which, with flange 22 of arm 5, lies in the plane of a roller 7 fixed upon lever 316.

In additive operations roller 7 will contact cam surface 21 of switch 6 and thereafter with the rear end of flange 22, whereby arm 5 will be raised, thus rocking shaft 2 and linkage 10, to unmesh the pinions 472 of the accumulator before the actuators are allowed to move. During thec ontinued forward movement of actuators 610, arm 5 will be held in raised position by engagement of roller 7 with the lower surface of flange 22. At the end of the forward stroke, roller 7 will lift the forward end of switch 6 away from a lug 20 of arm 5, and will thereafter move out of contact with the switch, which will return under influence of a spring 75 into normal relation with the arm. Upon the return stroke of the operating mechanism, roller 7 will engage a cam surface 23 of switch 6, restoring arm 5 and the parts 419, 10 and 403 to original position, remeshing the pinions 472 with the segments 610 to effect the registration.

Figure 4:
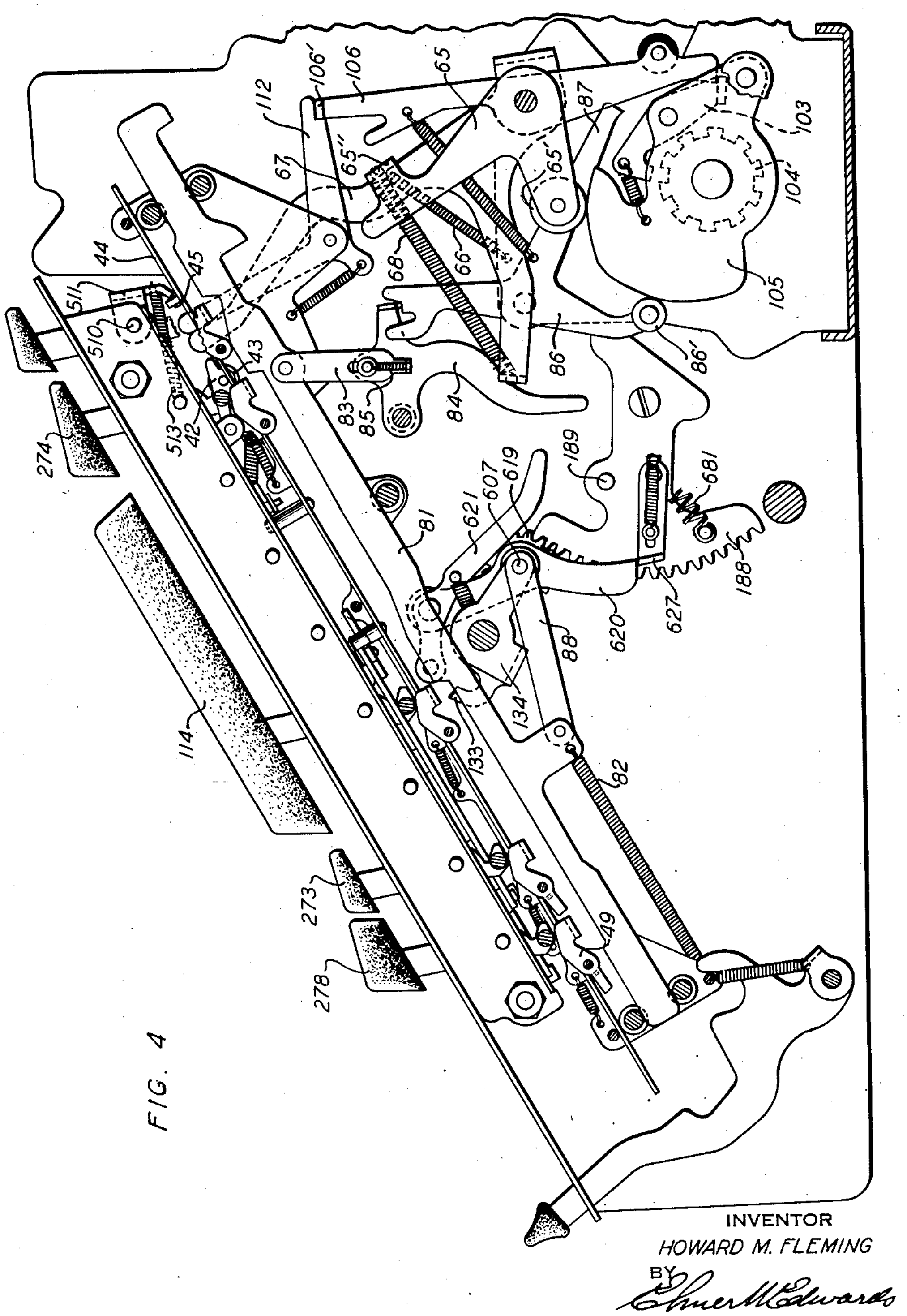
Fig. 4 is a right side elevation showing the accumulator zeroizing slide and associated total mechanism.

Near the end of a cycle of operation of the machine, slide 44 is restored to disengage the clutch and restore the various control elements to normal position. For this purpose an anti-friction roller 65′ mounted on a lever 65 (Fig. 4) will be engaged by a cam projection of plate 105, and rocked clockwise against tension of a spring 66 secured at one end to lever 65 and at its other end to a fixed framing of the machine. A pivoted lever 67 has yieldable connection with lever 65 through means of a spring 68, lever 67 extending upwardly and into the path of movement of the lug 45 of slide 44. Displacement of lever 65 by the cam edge of plate 105 will therefore retract slide 44 to its normal position of rest, thereby unlocking the operation keys and permitting roller 43 to again fall into latching engagement with said slide.

In the above described restoral of slide 44 the projection 45 will permit latch 112 to fall and rest upon the projection 106′ of latch 106. Near the end of the clockwise movement of lever 65 a projection 65'' thereof engages and rocks lever 106 into the path of movement of clutch pawl 103 to disengage said pawl from driving member 104, whereupon latch 112 re-engages projection 106' terminating the cycle of operation.

Each numeral wheel unit is connected to the higher order numeral wheels by well known tens transfer mechanism of the "crawl" carry type, such as described in U. S. Patent 1,828,180, issued to Clyde Gardner on October 20, 1931.

*Printing*

Printing is effected during a cycle of operation upon a record sheet which is inserted around the usual platen 891 (Fig. 1) mounted within the framing of the carriage in the well known manner. The digit type is solidly set in the type bars 611, and the type bars are normally held in forward position substantially spaced from the platen 891 by means of springs 145. Adapted for engagement with the forward face of each type bar 611 is a hammer 146, mounted upon a shaft 147 fixed in the machine frame. The hammers are operated by means of their respective springs 148, and are normally held tensioned by means or a bail 149, suspended from shaft 147 and connected by a link 150 with a rock arm 151. Arm 151 is fast upon a shaft 302 upon which is also fast a lever 327 (Fig. 6) having link connection 328 with the motor driven arm 316' fast near the left end upon shaft 301. Thus, upon motor operation, and during the counterclockwise rotation of frame 616, shaft 302 will be rocked clockwise and bail 149 moves forward slowly permitting any of the hammers 146 which are to be inactive relative to printing to rotate gradually therewith in a clockwise direction until the type bars 611 are forced to a position wherein the type at the printing line will be closely adjacent to the surface of platen 891. Bail 149 is held in this position during the printing operation, effective in the active orders as hereinafter described, and is subsequently returned to restore the hammers to normal position. This is the entire operation of any of the hammers 146 located in columns to the left of those wherein keys 215 have been depressed.

Action of the hammers 146 in the active columns is controlled as follows:

A series of latches 152 (one for each hammer 146) is provided, the latches being pivotally mounted upon a shaft 153 fixed in the machine framing, and being urged counterclockwise to latching position by the springs 148, which connect the latches 152 and the hammers 146. Each latch 152 lies beneath a lug 154 of the related type bar 611, and in the normal position of rest of the type bars the latches are held out of engagement with lugs 155 of the hammers. Upon rotation of an actuator 610, however, and consequent displacement of a type bar 611, the lug 154 of said bar will move away from the latch 152 which will thereupon rise and engage lug 155 of the hammer. This engagement is timed to occur before any substantial movement of the hammers is allowed by bail 149.

A bail 156, supported from shaft 153, is provided with a depending hook 157 (Fig. 3) adapted to be engaged near the extreme forward movement of the actuator drive by a lug 158 of arm 151, depressing bail 156 against tension of a spring 159 thereby releasing latches 152 from engagement with the hammers 146. Thereupon hammers 146 will be violently operated by their springs 148, imparting sufficient momentum to the type bars 611 to insure printing engagement of the type with the record sheet.

In order to effect printing of zeros by the type bars to the right of those displaced by the actuators 610, the value printing hammers are provided with the usual overlapping tails 160 (Fig. 1 and 5) which serve to hold in spring charged condition the hammers located to the right of one secured by its latch. In other words, a latch 152, upon movement of bail 156, will release its related hammer 146, and all hammers lying to the right thereof, for printing operations as more fully shown and described in the reference patents.

It may be noted, however, that in lieu of an offset projection 160 the 8th order hammer is provided with a pin 161 which normally engages a pawl 518 pivoted to the adjacent higher order hammer, to be described in more detail later.

*Total and sub-total*

As well known and fully set forth in the reference patents, in machines of this type, totals are printed by first disengaging the actuators 610 from their column latches 214 and thereafter from the frame 616 by tripping dogs 617 in successive order from right to left, allowing the racks to move subtractively under influence of their springs 683 to rotate the accumulator wheels to zero, in which position the wheels are held by engagement with appropriate stops. Following this, the cycling of the machine will effect operation of the printing means at the end of the forward stroke of the operating means and thereafter frame 616 will pick up and return the actuators to normal position. Successive release of the racks 610 is essential because of the character of the tens transfer mechanism employed between the accumulator wheels, i. e., the "crawl" carry type, wherein every unit of movement of a lower order wheel transmits one tenth of a unit of movement to the next adjacent higher order wheel. Therefore, in zeroizing as each lower order wheel is returned to zero it will subtract from the higher order wheel the fractional movement previously transmitted.

The above and other special functions are effected upon depression of the total key 278, under control of various spring slides 74, 81, and 94 (Figs. 2–4) lying beneath pivoted bails 49, depressible by their related machine operating key to control the extent of forward movement of said slides as will now be described.

Depression of total key 278 will release slide 44 (Fig. 2 and 8) which overlies slides 74, 81, and 94, to start motor operation, as previously described for the other keys and will permit a full movement of the slide 74 to set the operation control means 6 for subtractive operation, that is to say, the accumulator pinions 472 will be left in mesh during the zeroizing operation, and will be unmeshed before the additive stroke of the actuators 610 is effected.

The zeroizing of the accumulator wheels is effected by successive operation of the wheels from right to left of the accumulator, as in Patent No. 1,932,013 hereinbefore referred to, this action being controlled by spring operated means. In the present instance, it is desired to effect the various adjustments of the controlling mechanisms by power from the motor, and consequently upon depression of the total key the clutch will be allowed a limited driving movement, during which the stop bars 615 will be moved laterally free of the column stops 214, as described more fully later, and then the motor operation will be interrupted to give time for the completion of the zeroizing operation, at the conclusion of which the clutch will be re-engaged and the cycle of operation completed. For this purpose, a slide 81 (Fig. 4), which is blocked against operation when bails 49 related to other operating keys are depressed, will be allowed to operate, i. e., move forward, upon depression of the total key, under influence of spring 82. Slide 81 is pivotally connected with a link 83 having pin and slot engagement with a latch 84.

Forward movement of slide 81 is effected simultaneously with forward movement of an arm 76 (Fig. 2), oscillated during each cycle of operation of crank arm plate 105, and link 83 is moved downwardly, tensioning a spring 85 which then tends to move latch 84 clockwise about its pivotal support. The free end of latch 84, however, engages a spring pressed lever 86, pivoted upon the machine frame and having an anti-friction roller 86′ engaging the cam edge of plate 105. During the first part of the cycle of operation the roller 86′ of lever 86 will ride to and beyond the high point of the plate 105 as the latter rotates, rotating lever 86 clockwise and allowing latch 84 to fall into a notch formed in the upper end of said arm, to maintain the arm in rocked position. A rearward extension 87 of lever 86 is thus held by latch 84 in the path of rotary movement of the clutch pawl 103. Engagement of the pawl with extension 87 serves to disengage the pawl from the driving member 104 of the clutch and to hold it in disengaged position.

Slide 81 also has link connection 88 with an arm 134, pivoted upon the machine frame and provided with a finger 133 which will be brought during the movement of slide 81 into contact with the releasing arm 621 of a latch 620, disengaging said latch from a projection 627 secured upon a total segment 188, thereby releasing the segment for operation under the influence of a spring 681. Segment 618 drives a pinion 619 secured on the end of a shaft 607 (Figs. 1 and 4), extending across the machine, said shaft being provided with a series of helically disposed pins which will successively trip the series of dogs 617, normally securing the actuators 610 to frame 616. Dogs 617 are also provided with shoulders normally restraining a series of spring pressed stops 613 in their inactive position. Upon displacement of a dog 617 the related stop 613 will be released, being brought by its spring into the path of movement of a zero stop 457 of the related accumulator wheel. During this preliminary setting of the total controls, the column latches 214 will also be released, in the manner hereinafter described, so that actuators 610 upon successive release from the frame 616 will be moved by the springs to rotate the related accumulator wheels to zero.

Upon complete rotation of shaft 607, the projection 627 of segment 188 will contact with a rearward extension of the arm 621 rocking the forward end of said arm out of contact with the finger 133, and allowing latch 620 to move under influence of its spring into position to re-engage the projection 627 upon restoration of segment 188. Also at this time, a pin 189 fixed in segment 188 will engage a depending arm of latch 84, rocking said latch out of engagement with the lever 86, whereupon said arm will be rotated counterclockwise by its spring to move the extension 87 out of restraining contact with clutch pawl 103. Thereupon pawl 103 will re-engage with driving member 104 and the operating cycle of the machine will be resumed. During the forward stroke of the operating means segment 188 will be restored to normal position and re-engaged by its latch 620. This restoring means being well known is not illustrated in the present disclosure.

Figures 8, 9:
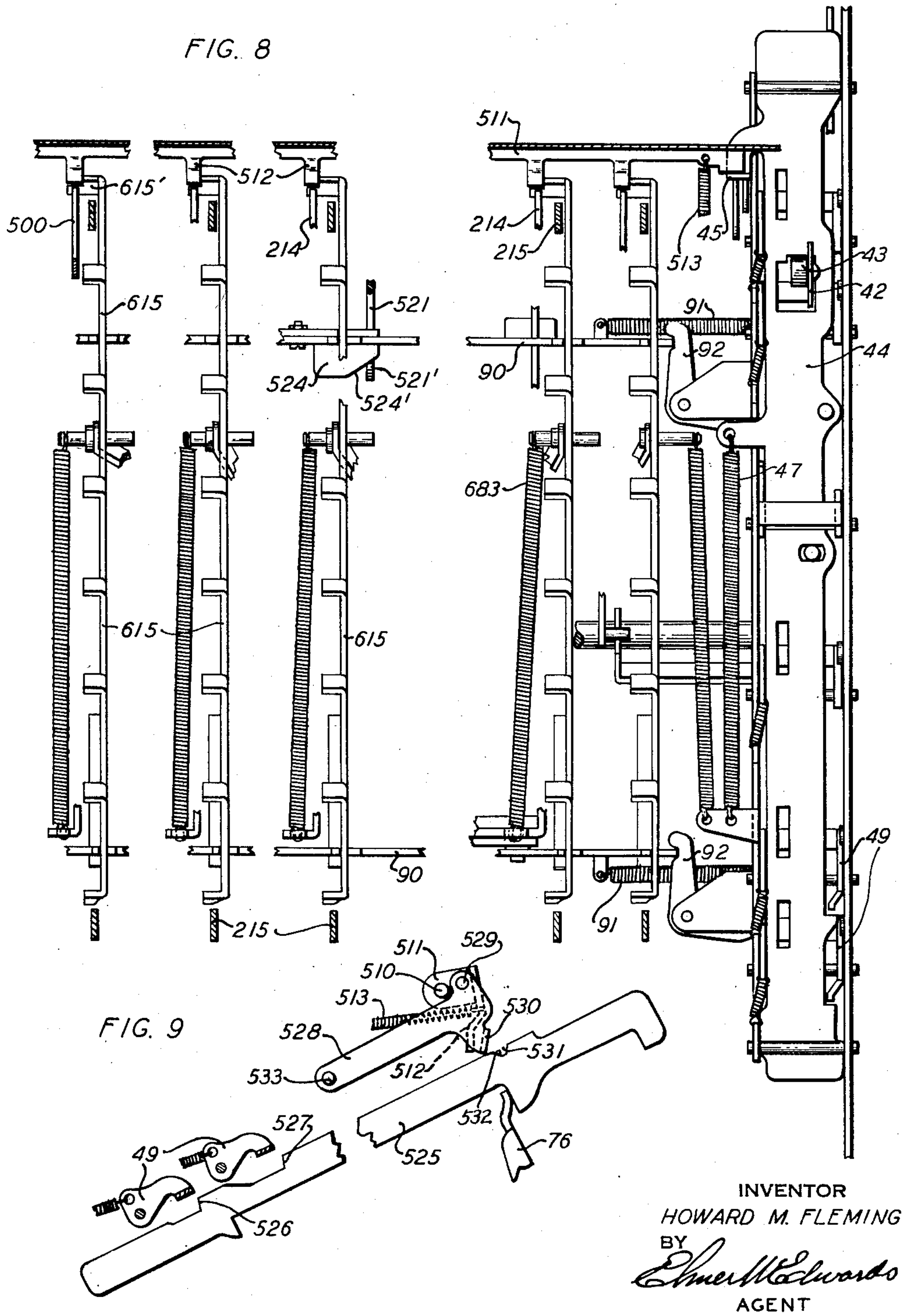
Fig. 8 is a detail plan view of the clutch release slide, the stop bars and column latches and the universal member cooperable therewith for controlling an item count.
Fig. 9 is a detail right side elevation of an alternative means for controlling a release of the universal member for the column latches.

As more fully set forth in reference Patent 2,330,270, in order that the keyboard may be free for the setting up of an item during any portion of the totaling operation, the index bars 615 are designed to be shifted laterally out of position of engagement with the key stems as follows:

The index bars 615 are supported near their ends in sliding plates 90 (Figs. 1 and 8) urged toward the right side of the machine by springs 91. The ends of the plates are engaged by a pair of bell crank levers 92, these levers being provided with shoulders engaging projections 93 (Fig. 3) of the slide 94. Slide 94 lies parallel to the slides 74 and 81, and is likewise reciprocated by the operation of lever 76 (Fig. 2), being moved toward the front of the machine under influence of the springs 91. In add, subtract, and non-add operations, bails 49 of the add, subtract, and non-add keys are depressed into position in front of suitable notched shoulders 95 (Fig. 3) cut in the slide 94, to prevent operation thereof. Normally, the lever 76 through slide 94, will serve to hold the index bars 615 in normal relation to the digit keys 215 and to the zero latches 214 as seen in Fig. 8. Upon forward movement of lever 76 and slide 94 therewith, springs 91 will move plates 90 and index bars 615 toward the right, out of position of contact with the keys and also out of contact with the zero latches 214. The plates 90 operate individually, so that there can be no jamming of the parts due to twisting action.

Sub-total key 273 operates precisely in the manner of total key 278, except that slide 74 (Fig. 2) is held in a partially operated position by engagement of the bail 49 related to the sub-total key with a shoulder 77 of the slide. Thus, switch 6 is held in position for a non-add operation, whereby the total subtracted from the accumulator wheels is restored thereto during the return stroke of the operating mechanism, all as well known in the art and described in the reference patents.

*Item count means*

As earlier set forth the present invention contemplates using the two left-hand orders of accumulator wheels 473 for the purpose of accumulating a count of item values as registered upon the lower orders accumulator wheels. Suitable means, to be described, are provided for splitting the printing devices between the item count wheels and the value registering wheels, and to disable the printing of an item count during a machine cycle in registering an item value.

Figures 5, 6, 7:
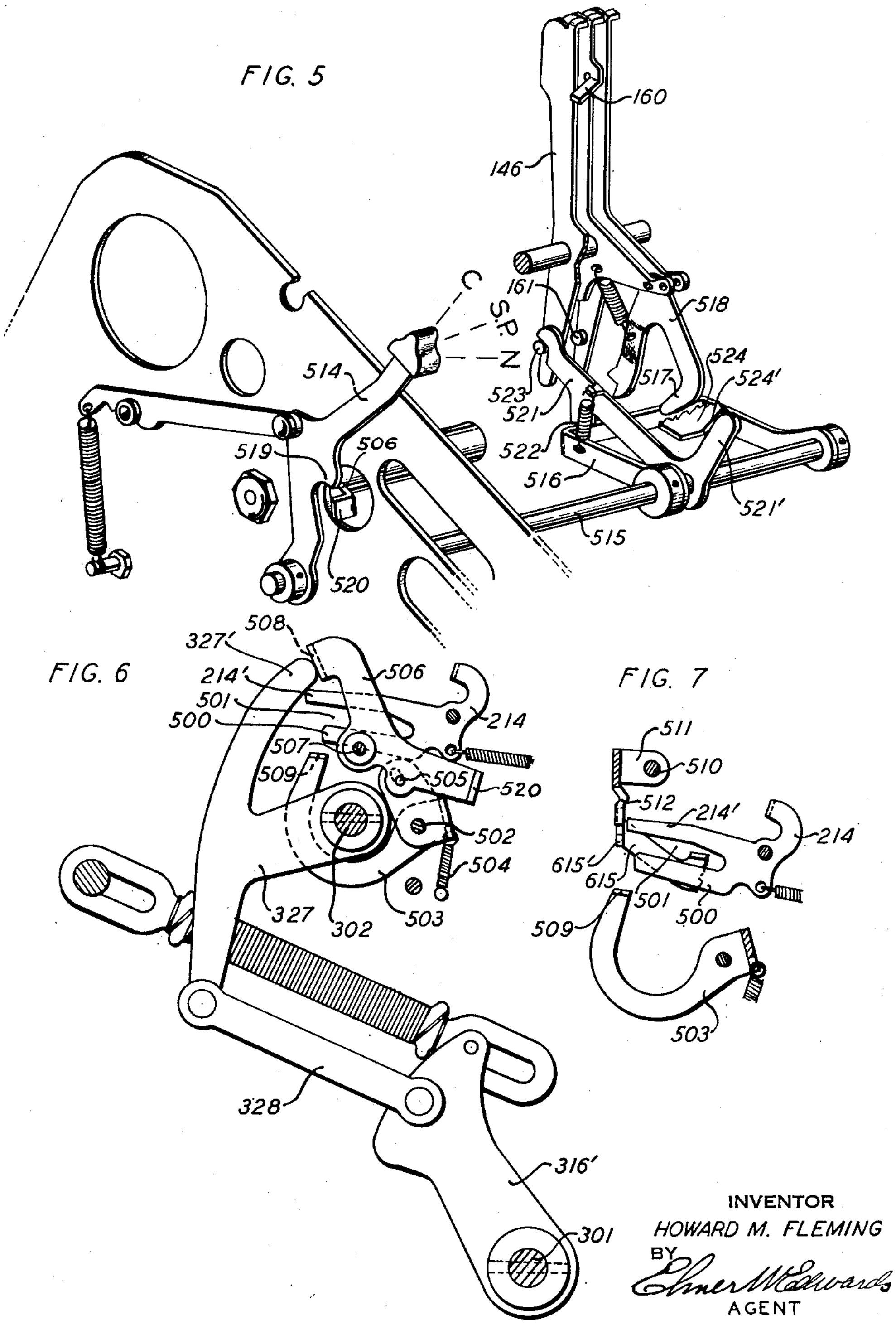
Fig. 5 is a left side perspective showing means for setting and controlling a printing hammer block and split printing devices.
Fig. 6 is a left side elevation of the item count control means.
Fig. 7 is a view similar to Fig. 6 with the parts in position assumed when a digit key is depressed.

With reference to Fig. 6 the column latch 214 related to the lower order of the two left-hand columns of the machine is provided with a finger 500, shorter of length and spaced from the arm 214′ of said latch to form an open end slot 501.

Pivotally mounted upon a stud 502 fast to the left side frame of the machine is a lever 503 biased for clockwise movement by a spring 504 and having pin and slot connection 505 with a lever 506 pivoted upon the machine frame at 507. Lever 506 is provided with a lug 508 having engagement with an upwardly extending arm 327′ of the lever 327, having link connection 328 with the power operated arm 316′ previously described. In the normal position of the parts a lug 509 of lever 503 is thus held downwardly out of engagement with finger 500.

As previously described, lever 327 in the forward stroke of lever 316′ during a cycle of operation is rocked in a counterclockwise direction, as viewed in Fig. 6, and arm 327′ moving away from lug 508 will (unless otherwise prevented as hereinafter described) permit movement of levers 506 and 503 by spring 504. During said movement projection 509 engages the under surface of finger 500 and rocks latch 214 upwardly, moving arm 214′ out of cooperation with index bar 615 and the finger 500 into position for cooperation with said bar. The rearward surface of shortened finger 500, in raised position, is adapted to limit index bar 615 to a single step of forward movement to rotate the item count wheel one step of additive or subtractive movement in accordance with the sign character of operation, as determined by operation of plus key 114 or minus key 274 previously described.

The invention also provides the following means for rendering the item count means ineffective in operations in which no digit value keys are depressed.

Figure 1:
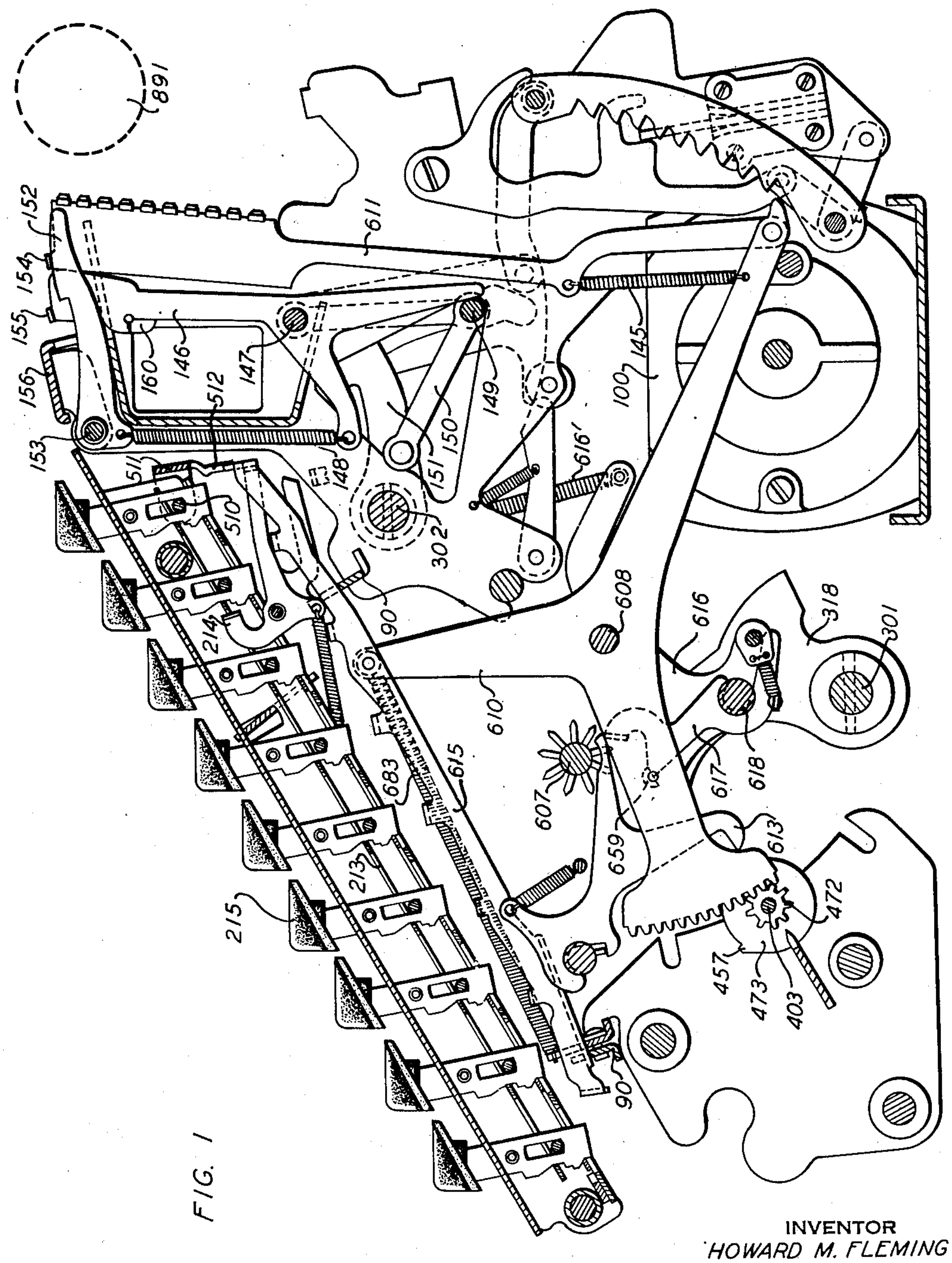
Fig. 1 is a right side elevation showing a cross section of the keyboard, registering and printing devices.

Pivotally supported upon a transverse rod 510 (Figs. 1 and 4) of the keyboard is a universal bail 511 extending transversely of the machine and provided with a plurality of projections 512 (Fig. 8), there being a projection 512 related to each column latch 214 provided in the machine. Bail 511 is held in a rearward position, against clockwise urge of its spring 513, by engagement with the lug 45 of operating slide 44, to thereby hold projections 512 to the rear of the path of movement of column latches 214, as shown in Fig. 1.

As previously described, the depression of any of the operating keys rocks bell crank 42 (Fig. 2) to lift roller 43 out of engagement with slide 44, thereby releasing said slide for forward movement by its spring 47 (Fig. 8) to initiate a machine cycle of operation. Upon forward movement of slide 44, projection 45 releases bail 511 for clockwise movement by its spring 513, and projections 512 moving forwardly therewith are positioned above the column latches 214. During the machine cycle of operation arm 214′ of the item count latch 214 will now be held in depressed or zero control position (against the displacement by projection 509 of lever 503 earlier described) by engagement of said arm with the underside of the related displaced projection 512 of bail 511 and no counting movement therefore of the index bar 615 is permitted.

On operations wherein a value key 215 has been depressed, the consequent forward movement of slide 213 (Fig. 1) by said key lifts the related column latch 214 out of the path of movement of its index bar 615 and in so doing also positions the rearward edge of said latch forwardly of the related projection 512 of bail 511 (Fig. 7). Under such a condition during the forward movement of operating slide 44, in initiating a machine cycle of operation, bail 511 will be held in its rearward position by engagement of any projection 512 with a related raised column latch 214 and the item count column latch will be free to raise during such operations and bring finger 500 of said latch into position for controlling a single step of movement of the item count means, as previously set forth.

It is frequently desired to first pick up and register a previous count by setting up the count total upon the item count keys and the items value total on the right-hand keys before continuing with an automatic count of items. This can be accomplished, as hereinafter described, by manual adjustment of a three position lever 514 (Fig. 5) to its central or "Split Printing" position before initiating a cycle of operation.

Lever 514 is secured to a shaft 515 pivoted in the framing of the machine and having fast thereon a rearwardly extending bail 516. Bail 516 is adapted in the forward or "Normal" operations setting position of lever 514 to be held upwardly, free of the cam surface 517 of the pawl 518 pivoted to the 9th order printing hammer, which corresponds to the units order of the item counting section. Lever 514 is also provided with a shoulder 519 adapted in the forward position of said lever to be positioned above a projection 520 of lever 506 to prevent the previously described movement of said lever, and thereby disable the described adjustment of the item count finger 500 to item counting position. Thus with lever 514 in its extreme forward position, the full capacity of the printing and registering means are available for the usual normal operations of the machine.

Adjustment of lever 514 from "Normal" to "Split Printing" position rocks bail 516 downwardly whereupon said bail engaging cam surface 517 rocks pawl 518 out of engagement with the pin 161 of the 8th or highest order item value printing hammer immediately to the right of the item count hammers, thereby effecting a split in the printing means to enable independent printing operations by the item count and item value hammers.

During operations in which lever 514 is in its central or "Split Printing" position, the shoulder 519 thereof remains above projection 520 of lever 506 and will prevent adjustment of finger 500 to item count position, as above described.

In both "Normal" and in "Split Printing" operations, a depression of any digit key in the column related to the item count zero latch 214 will rock said latch sufficiently to lift arm 214′ free of the lug 615′ of the related index bar 615, while positioning the open end slot 501 of said latch adjacent the path of movement of said lug as seen in Fig. 7, so that said bar may be free to move forwardly during a cycle of operation until stopped by engagement with the depressed key.

Adjustment of lever 514 to rearward or "count" position will carry shoulder 519 to rearward of projection 520 so that levers 506 and 503 are then free for movement during a cycle of operation to adjust finger 500 to item count control position.

It is undesirable to print an item count during each value registering operation. Therefore, adjustment of lever 514 to "count" position is adapted to control means for blocking operation of the item count printing hammers as follows.

Loosely mounted on the shaft 515 is a latch member 521 yieldably connected to bail 516 through means of spring 522. Latch 521 is held by spring 522 against the top edge of bail 516 and is adapted for movement with said bail in the adjustment of lever 514. Fast to the highest order printing hammer 146 is a pin 523 and upon adjustment of lever 514 to its extreme rearward position, latch 521 will move downwardly into engagement with pin 523, blocking movement of said hammer and by means of overlapping tail 160, also the next lower order hammer.

In the adjustment of lever 514 to "count" position, the forward surface of bail 516 will hold pawl 518 disengaged from pin 161; therefore, the lower or item value printing hammers will remain free to move.

So that item count totals may be printed along with item value totals, means associated with the total taking devices are provided to re-enable the item count printing hammers, and to also render the item count control finger 500 ineffective during totaling operations. It will be recalled that in total taking operations support plates 90 (Fig. 8) for the index bars 615 are first caused to be moved toward the right before a release of the bars 615 takes place. Thus projection 615' of the bar 615 related to the item count control finger 500 is moved out of zone with said finger and said bar will be free to move under control of the item count register wheel in the usual manner. It will thus be obvious that no item count is effected during totalizing operations.

Fast to the rear support plate 90 and immediately to the left of latch member 521 (Figs. 5 and 8) is a cam shoe 524 provided with a cam surface 524' adapted during the described displacement of said plate to engage an upwardly extending arm 521' of latch 521. Engagement of cam face 524' with latch 521 will rock said latch out of engagement with pin 523 of the item count hammer 146 so that during the subsequent total taking cycle of operation the item count printing hammers are then free to print the total of the item counts accumulated in those register wheels 473 related to item counting.

Fig. 9 relates to a modified form for controlling operation of universal bail 511 in such manner that a digit key 215 may be set during totalizing operations and comprises a special slide 525, similar to and adjacent the control slides 74, 81 and 94, said slide being spring urged forwardly and movable during a machine cycle of operation under control of lever 76 in the manner as described for slides 74, 81 and 94. Slide 525, however, is provided with projections 526, 527 cooperable only with the bails 49 which are related to the total and sub-total keys. Therefore, during operations initiated by the plus or minus keys, slide 525 will be permitted to move forwardly. Depression of the total or sub-total keys, however, will depress its related bail 49 into the path of movement of projection 526, 527 to thereby prevent a forward movement of slide 525.

Pivotally mounted upon a rod 533 supported in the keyboard plates is a rearwardly extending lever 528 having suitable pivotal connection 529 with the right end plate of universal bail 511. A projection 530 of lever 528 engaging the top edge of slide 525 serves to hold bail 511 in counterclockwise position against tension of its spring 513, so that projections 512 are positioned rearwardly of the column latches 214. Slide 525 is provided with a notch 531 adapted during forward movement of said slide to move into cooperative position with projection 530 so that during a plus or minus cycle of operation in which said slide is permitted to move, projection 530 entering notch 531 permits clockwise movement of bail 511 by spring 513 and projections 512 of bail 511 will cooperate with column latches 214 in the manner and purpose as heretofore fully set forth.

Near the end of the cycle arm 76 will restore slide 525 and cam edge 532 in notch 531 will act to lift lever 528 and restore bail 511 to normal position.

In total, sub-total operations, however, projections 526, 527 will engage with a depressed bail 49 and prevent movement of slide 525, and universal bail 511 during such operations will therefore be held against movement so that projections 512 will remain rearward of the column latches 214 and said latches thus being free to move, it is then possible to set a digit key 215 during a total or sub-total operation.

Having now set forth a novel and simple means which is adapted upon a setting of any digit key in conjunction with a subsequent operation of the control means for initiating cyclic operations to be adjusted by the cyclically operable devices to a position for limiting operation of an actuator and register wheel of a listing calculator to a single step of movement, for the purpose of automatically counting into a portion of the register means thereof item values as registered upon said register, what I claim is:

1. In a machine of the class described the combination including a value accumulator, actuating mechanism therefor including differentially movable racks, a differential stop bar movable with each of said racks, cyclically operable means for moving said accumulator into operative relation to said racks and for imparting movement to said racks, column latches adapted to prevent movement of a related stop bar and its associated rack, value setting keys arranged in columns and adapted to release the related column latch and intercept said stop bar; means for controlling item counting in a portion of said accumulator including a column latch movable to a plurality of positions and adapted in one position to prevent a movement of its related stop bar and actuator when no related digit key is depressed and adjustable by depression of a related digit key to a position for permitting a movement of said stop bar and actuator in accordance with the value of the depressed key and movable in yet another position for limiting the movement of said bar and actuator to a one step movement for effecting an item count, adjustment means operable by the cyclically operable means to adjust the item count column latch to item counting control position, and means for enabling and disabling said adjustment means.

2. The invention set forth in claim 1 and wherein the means operable by the cyclically operable means to adjust the latch to item counting position includes a yieldably operable member.

3. The invention set forth in claim 2 including operations control keys, a clutch control slide releasable by said keys for effecting a cycle of operation and means under control of said slide and adapted for displacement therewith to prevent said adjustment of the item count column latch when no column latch has been displaced by a value setting key to thus disable a counting operation of the item counter actuator rack.

4. The invention set forth in claim 3 wherein said preventing means includes a universal bail movable to sense any column latch displaced by operation of its related digit keys, and wherein a displaced column latch prevents movement of said bail to thus disable said preventing means when a value key is operated and thereby enable the item count means.

5. The invention set forth in claim 2 and including a lever manually settable for preventing movement of said yieldably operated member and said adjustment thereby of the item count column latch.

6. The invention set forth in claim 5 having total taking devices including means for disassociating the item count actuating means from the item count control means whereby the item count control means is disabled during an operation of the total taking deviecs.

7. The invention set forth in claim 6 having printing means including a plurality of hammers operable during operation of the cyclic operating means to effect printing, means adjustable by the manually settable lever to effect a printing split between the value printing and item printing hammers, means settable by a further movement of said manually settable lever to prevent a printing movement of the item count hammers, and means under control of said disassociating means for disabling said preventing means and thereby permit a printing operation of the item count hammers in totalizing operations.

8. The invention set forth in claim 1 including operating control keys, a slide yieldably movable under control of the cyclically operable means, and a universal bail cooperable with said column latches and movable under control of said slide to prevent the said adjustment of the item count column latch to item counting position.

9. The invention set forth in claim 8 wherein said universal bail is adapted to sense any column latch displaced by operation of a value key and wherein when no value key is depressed said bail is permitted to be displaced and thereby block subsequent movement of a column latch and its related column of value keys, and including means settable upon operation of certain of the operations control keys for disabling the movement of said slide and thereby disable displacement of said universal bail during certain selected types of operations of the machine.

10. The invention set forth in claim 9 and wherein said slide is provided with stops associated with the total and sub-total operations control keys to prevent a movement of said slide upon operation of either of said keys and wherein said slide is permitted a movement in operations related to other operation control keys.

References Cited in the file of this patent

UNITED STATES PATENTS

| Number | Name | Date |
|---|---|---|
| 996,260 | Kilpatrick | June 27, 1911 |
| 1,238,809 | Pentecost | Sept. 4, 1917 |
| 2,052,604 | Christian et al. | Sept. 1, 1936 |
| 2,056,536 | Sampson | Oct. 6, 1936 |
| 2,114,604 | Mehan | Apr. 19, 1938 |
| 2,189,851 | Williams et al. | Feb. 13, 1940 |

FOREIGN PATENTS

| Number | Country | Date |
|---|---|---|
| 453,280 | Great Britain | Sept. 8, 1936 |
| 457,273 | Great Britain | Nov. 24, 1936 |